Oct. 22, 1935.  T. M. RECTOR  2,018,091
EXTRACTING OIL FROM CASHEW NUTS
Filed July 30, 1931
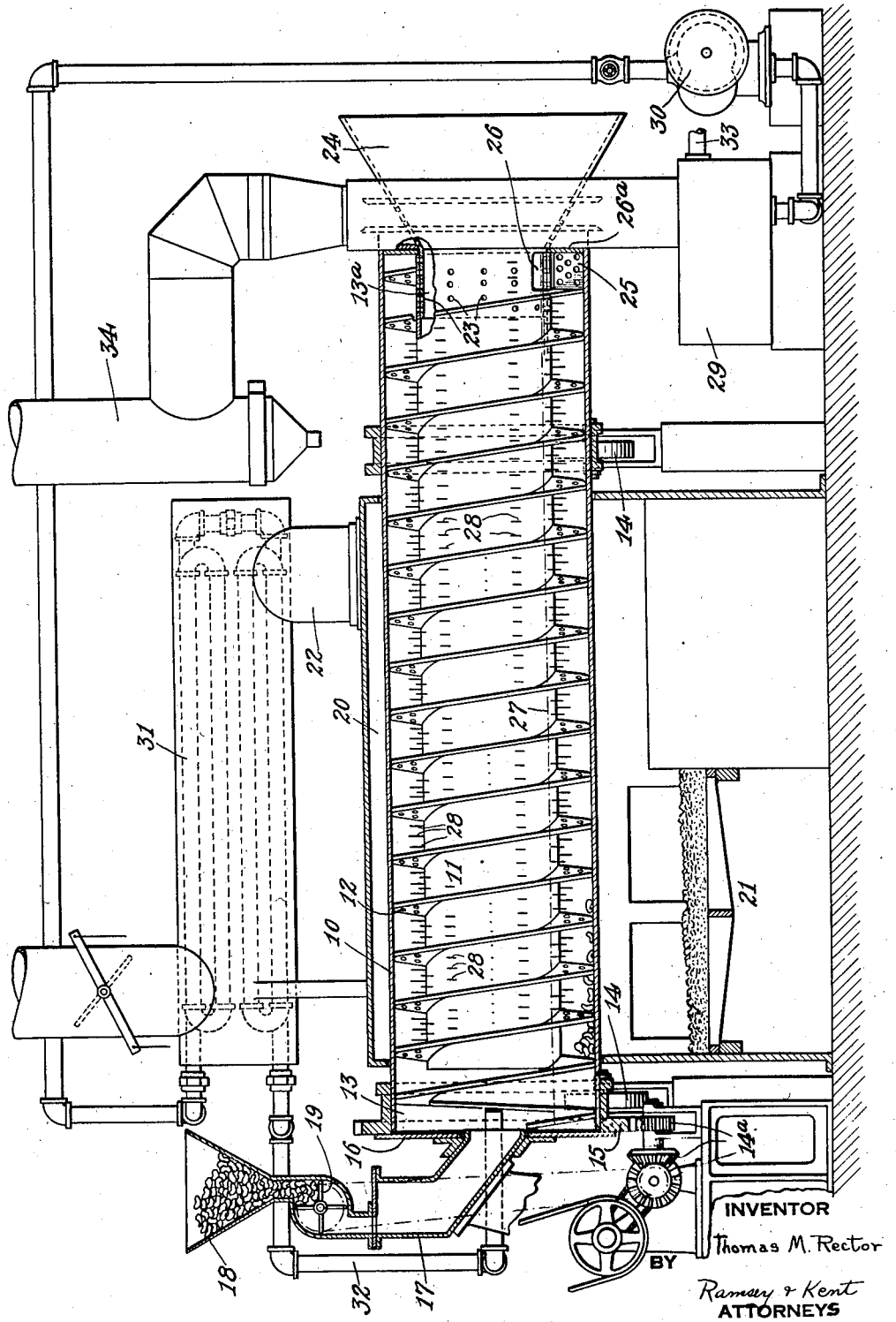
INVENTOR
Thomas M. Rector
BY
Ramsey & Kent
ATTORNEYS Patented Oct. 22, 1935

2,018,091

UNITED STATES PATENT OFFICE 2,018,091

EXTRACTING OIL FROM CASHEW NUTS

Thomas M. Rector, Rutherford, N. J., assignor, by mesne assignments, to Baker-Bennett-Day, Inc., New York, N. Y., a corporation of Delaware Application July 30, 1931, Serial No. 553,959

13 Claims. (Cl. 87—6)

This invention relates to a process of and apparatus for extracting the oil from the shell of the cashew nut in such a way that the oil may be collected with a minimum of loss and the cashew nut prepared for shelling with a minimum of heating of the kernel.

The shell of the cashew nut contains twenty five percent of a dark corrosive oil substance which is soluble in alcohol and most organic solvents, but insoluble in water. It is now used to a very limited extent in India as a preservative for the bottoms of boats and for coating wood, paper, etc. as a protection against the attacks of insects. It has lately been found to have very remarkable and valuable chemical properties.

The cashew kernel is enclosed in a tough leathery shell containing the above described oil in comparatively large cells. The shell is approximately $\frac{1}{8}''$ in thickness. The kernel of the cashew nut is about one inch long and three eighths inch ($\frac{3}{8}''$) in diameter at its point of greatest thickness.

The chemical composition of the kernel is similar to that of the almond. It contains about 45% of a bland yellow oil, the physical properties of which are like sweet almond oil. The chemical analysis of the oil is almost identical to that of pure olive oil. The cashew kernel is highly valued as a delicacy, being used as a salted nut and for baking and confectionery purposes.

The present method of preparing the nuts for shelling consists of heating a small quantity of the nuts in a flat pan over a hot fire until the shell of the nut is carbonized. During this process the shell oil evaporates in the form of a white smoke which later catches fire. The fire is quenched with sand and the nuts allowed to cool until they can be handled. They are then shelled by hand, the entire operation requiring skilled labor. Practically all the oil is lost during this method of shelling.

A method of extracting the shell oil is in use in India which consists in placing a large quantity of nuts in a cone shaped container and submitting to a long slow heating during which the oil collects at the point of the cone and is drawn off. In this process the kernels are injured greatly and have little commercial value.

A main object is to provide an improved process for extracting oil from the shells of cashew nuts, without injuring the shell oil. This object is accomplished by submerging the whole nuts, or the nut shells, in a heated bath of the shell oil.

A particular object of this invention is to provide an improved method of and mechanical means for automatically conducting the roasting and oil extracting operation in such a manner that the maximum quantity of oil will be collected with the minimum scorching of the cashew kernels.

Various other objects and advantages of the invention will be specifically pointed out or apparent hereinafter, in the course of a description of a preferred one of the various possible forms of apparatus according to the invention as shown in the accompanying drawing; it being understood, of course, that such form is merely illustrative of one combination and arrangement of parts calculated to facilitate the method of the invention, pursuant to present preference and hence the detailed description now to be given is not to be taken as at all defining or limiting the invention itself.

In said drawing the view is largely schematic, but illustrates clearly, partially in elevation and partially in vertical section, such a preferred form of apparatus.

This application is in part a continuation of my application Serial Nos. 249,532; 269,301 and 453,248.

The invention consists broadly of moving the nuts through a bath of heated shell oil in such a manner as to cause the oil to exude from the shells but without scorching the nut kernels and without cracking the shell oil. Thereafter the oil and shells are separated and collected.

Certain important factors must be considered in carrying out the process. For example, it has been found that the kernel of the cashew nut scorches at about 250° F., and it is therefore important that the nut kernels should not exceed by any considerable amount a temperature of about 250° F., as above that temperature the kernels will become scorched and cannot be sold as edible nuts. It is also true that when the cashew oil is heated to a temperature in excess of about 600° F., it cracks into constituents that are different from, and apparently less valuable than, the cashew oil.

In the apparatus disclosed in the drawing, the nuts are heated in cylindrical member 10. An inner core 11 is placed within the cylinder 10 and a perforated flange 12 forms a spiral channel from the closed receiving end 13 of the cylinder to the discharge end 13ª. The cylinder is suitably supported as by the rollers 14 so that it can be rotated and means is provided for rotating the cylinder, such as the gears 14ª which cooperate with a gear 15 mounted on the cylinder. The parts 10, 11 and 12 are fastened together in such a manner that they rotate as a unit.

The plate 16 closes the receiving end of the tube 10 and the chute 17 communicates with the interior of cylinder 10 by an aperture in the center of plate 16. The nuts are fed from the hopper 18 by means of the valve 19 which prevents backward flow of gases.

Suitable means is provided for heating the cylinder 10, the means illustrated being a furnace 20. The furnace is arranged with a firebox 21 adjacent the receiving end of the cylinder, so that the hot gases in travelling from the firebox 21 to the stack 22, will most strongly heat the receiving end of the cylinder 10.

For a short distance adjacent the delivery end of the cylinder is perforated as indicated at 23 and this inner core ends in a perforated discharge funnel 24. The spiral flange 12 has its end straightened out parallel to the longitudinal axis of the inner core 11, as indicated at 25, and there is an opening 26 formed through the inner core 11 adjacent the discharge shelf 25. An annular ring 26ª closes the space between the inner core 11 and the cylinder 10 at the delivery end, in order to maintain an oil level indicated by the line 27.

In carrying out the invention, the oil bath is kept heated partly through the action of the furnace and the unshelled nuts are fed into the apparatus from the hopper 18. It is desired to have the heat penetrate the outer shells of the nuts as rapidly as possible, while keeping the nuts at the lowest possible temperature. This is facilitated partly by feeding the nuts into the hottest end of the cylinder. This result is also aided by causing a recirculation of the oil.

This recirculation of oil is carried out by the following apparatus:

The surplus oil overflows from the cylinder into the oil tank 29 from whence it is drawn by a suitable pump 30, and is forced through the oil super-heater 31 which may be heated by gases from the flue 22, and it is then discharged by pipe 32 into the receiving end of the cylinder. In this way the hot oil coming from the super-heater is sprayed over the cold nuts, aiding in their rapid heating.

This process provides for suitable agitation of the nuts while they are being passed through the oil bath. It has been found that if the nuts are not agitated, oil bubbles coming from the shells of the nuts have an insulating effect and slow up the heating process. In the present process the nuts are thoroughly agitated partly by the action of the perforated flange 12 and partly by the motion of the circulating oil. This agitating effect may if desired be further assisted by special agitating rods 28 attached to the inner core.

Surplus oil is permitted to drain off from the oil tank 29 by way of the overflow 33 and is stored in suitable containers. Vapors from the cylinder are carried off by the flue 34.

In carrying out this invention, it is possible to remove the shell oil at as low a temperature as 300° F., although it is contemplated that the process may be carried out at temperatures between 300° F. and 600° F. The process efficiently removes the oil from the nut shells without cracking or injuring the oil, and at the same time it causes the shells to swell and conditions them for easy shelling. At the same time the kernels are kept at a very low temperature so that they are not injured in any way and they can be disposed of as a high quality edible product.

I claim:

1. The process of removing oil from the shells of cashew nuts, which comprises moving the nuts through a heated bath of the shell oil, removing surplus oil from the delivery end of the bath, heating part of the surplus oil, and returning the heated portion of the surplus oil to the entrance end of the bath.

2. The process of extracting oil from the shells of whole nuts which includes as an essential step the immersion of the nuts in a heated bath of the shell oil, the temperature of the bath and the period of immersion being relatively adjusted to effect discharge of a major portion of the contained shell oil without scorching of the nut kernels.

3. The process of extracting oil from the shells of whole nuts which comprises immersing the nuts in a heated bath of the shell oil, and agitating the nuts while so immersed, thereby causing rapid heating of the shells and discharge of the contained shell oil without scorching of the nut kernels or cracking of the shell oil.

4. The process of extracting oil from the shells of whole nuts which comprises immersing the nuts in a heated bath of the shell oil, and conveying the nuts through the bath while so immersed, the temperature of the bath and the period of immersion being adjusted to cause discharge of a major portion of the contained shell oil without scorching of the nut kernels or cracking of the shell oil.

5. The process of extracting oil from the shells of whole nuts which comprises providing a heated bath of the shell oil, one end of which is hotter than the other, immersing the nuts in the hotter end of the bath, and conveying the immersed nuts through the bath toward the cooler end thereof, the temperature of the bath and the period of immersion being adjusted to cause discharge of a major portion of the contained shell oil without scorching of the nut kernels or cracking of the shell oil.

6. The process of extracting oil from the shells of whole nuts, which comprises providing a heated bath of the shell oil, one end of which is hotter than the other, immersing the nuts in the hotter end of the bath, conveying the immersed nuts through the bath toward the cooler end thereof, and agitating the nuts while so conveyed, the temperature of the bath and the period of immersion being adjusted to cause discharge of a major portion of the contained shell oil without scorching of the nut kernels or cracking of the shell oil.

7. The process of extracting oil from the shells of whole nuts, which comprises spraying the nuts with hot shell oil while immersing them in a heated bath of the shell oil, and conveying the nuts through the bath while so immersed, the temperature of the bath and the period of immersion being adjusted to cause discharge of a major portion of the contained shell oil without scorching of the nut kernels or cracking of the shell oil.

8. The process of extracting oil from the shells of whole nuts which comprises providing a heated bath of the shell oil, one end of which is hotter than the other, and at a temperature of about 300°–600° F., immersing the nuts in the hotter end of the bath, and conveying the immersed nuts through the bath toward the cooler end thereof, the period of immersion being adjusted to cause discharge of a major portion of the contained shell oil without scorching of the nut kernels or cracking of the shell oil.

9. The process of extracting oil from the shells of whole nuts which comprises providing a bath of the shell oil, heating the bath so that one end thereof is hotter than the other, and at a temperature of about 300°-600° F., spraying the nuts with hot shell oil and simultaneously immersing them in the hotter end of the bath, and conveying the immersed nuts through the bath toward the cooler end thereof, the period of immersion being adjusted to cause discharge of a major portion of the contained shell oil without scorching of the nut kernels or cracking of the shell oil.

10. The process of extracting oil from the shells of whole nuts, which includes as an essential step the application of heat to the outer surface of the nuts by contact with a heated body of the shell oil, the temperature of the body and the period of contact of the nuts therewith being relatively adjusted to effect discharge of a major portion of the contained shell oil without scorching of the nut kernels.

11. The process of extracting oil from the shells of whole nuts, which includes surrounding each individual nut with a heated body of oil previously removed from the shells of the same variety of nut and thereafter maintaining the nuts continually, during the process, in a condition surrounded by and in direct contact with the shell oil, the temperature of the body of shell oil and the period of continuous contact of the nuts therewith being relatively adjusted to effect discharge of a major portion of the contained shell oil directly into the body of heated oil without scorching of the nut kernels.

12. The method of extracting the liquid from the shells of cashew nuts which comprises bringing a body of heated cashew shell liquid and a body of cashew nuts into contact in relative movement while maintaining the body of shell liquid within a temperature range in which the liquid in the shells will be expelled but below the temperature at which burning of the shell liquid and charring of the nut kernels can take place.

13. A method of extracting the liquid from the shells of cashew nuts wherein the nuts are heated in such a way that the shell liquid and the nut kernels are not raised above their respective burning and charring points, which comprises continuously introducing whole cashew nuts into a bath of cashew shell liquid, subjecting the nuts while in said bath to a temperature of about 400°-600° F. to effect discharge of their contained shell liquid into said bath, continuously removing the whole nuts from said bath after discharge of their contained shell liquid, and removing the surplus liquid from said bath.

THOMAS M. RECTOR.